(12) United States Patent
Fujita

(10) Patent No.: US 8,151,562 B2
(45) Date of Patent: Apr. 10, 2012

(54) EXHAUST DEVICE OF V-TYPE ENGINE FOR VEHICLE

(75) Inventor: Akihiro Fujita, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 1028 days.

(21) Appl. No.: 12/062,806

(22) Filed: Apr. 4, 2008

(65) Prior Publication Data

US 2008/0250777 A1 Oct. 16, 2008

(30) Foreign Application Priority Data

Apr. 13, 2007 (JP) ................... 2007-105416

(51) Int. Cl.
*F01N 3/10* (2006.01)

(52) U.S. Cl. .............. 60/302; 60/323; 60/324; 180/296; 180/309

(58) Field of Classification Search .................... 60/299, 60/322, 323, 324, 302; 180/296, 309
See application file for complete search history.

(56) References Cited

U.S. PATENT DOCUMENTS

| | | | | |
|---|---|---|---|---|
| 5,531,291 A | * | 7/1996 | Sato et al. | 180/297 |
| 5,713,330 A | * | 2/1998 | Hitomi et al. | 123/311 |
| 6,374,600 B2 | * | 4/2002 | Uegane et al. | 60/322 |
| 6,470,867 B2 | * | 10/2002 | Akiwa et al. | 123/672 |
| 6,799,540 B2 | * | 10/2004 | Akiwa et al. | 123/41.82 R |
| 6,901,748 B2 | * | 6/2005 | Gomulka | 60/286 |
| 2003/0062209 A1 | | 4/2003 | Iyoda et al. | |
| 2003/0062211 A1 | | 4/2003 | Tsuruda | |
| 2004/0118370 A1 | | 6/2004 | Ohsawa | |

FOREIGN PATENT DOCUMENTS

| | | |
|---|---|---|
| JP | 8-144751 | 6/1996 |
| JP | 2005-171792 | 6/2005 |

OTHER PUBLICATIONS

English language Abstract of JP 2005-171792.
English language Abstract of JP 8-144751.

* cited by examiner

*Primary Examiner* — Tu Nguyen
(74) *Attorney, Agent, or Firm* — Stein McEwen, LLP

(57) ABSTRACT

A V-type engine is disposed in an engine room of a vehicle so that each cylinder bank of the V-type engine extends substantially in a vehicle length direction. Exhaust manifolds are attached to both side of the V-type engine in a vehicle width direction, respectively. Catalytic converters are attached to both gathering portions of the exhaust manifolds, respectively, in a manner that an axial line of each of the catalytic converters extends substantially in a vehicle height direction. An auxiliary component is disposed above one of the catalytic converters in the engine room. An oil pan is attached to a lower portion of the V-type engine. The one of the catalytic converters is located lateral to the oil pan. A center line of lower portion of the oil pan is shifted with respect to a center line of the vehicle in the vehicle width direction so that the lower portion of the oil pan is away from the one of the catalytic converters.

2 Claims, 5 Drawing Sheets

EXHAUST DEVICE OF V-TYPE ENGINE FOR VEHICLE

The disclosure of Japanese Patent Application No. 2007-105416 filed on Apr. 13, 2007 including specification, drawings and claims is incorporated herein by reference in its entirety.

BACKGROUND

The present invention relates to an exhaust device of a V-type engine for a vehicle, which is disposed in an engine room of the vehicle.

In a V-type engine for a vehicle, each cylinder bank is arranged in an engine room in the front side of the vehicle. The cylinder bank is directed in a longitudinal direction of the vehicle (a vehicle length direction). An exhaust device of the V-type engine has exhaust manifolds attached to both side portions of the V-type engine in the vehicle width direction, a catalytic converter is attached to a gathering portion of each exhaust manifold in a manner that an axial line of the catalytic converter is extended in a lower direction of the vehicle and one catalytic converter is arranged in a lower portion of an auxiliary machine component in the engine room. In this exhaust device, the catalytic converters are symmetrically arranged in both side portions in the vehicle width direction of the V-type engine in many cases.

In this connection, Patent Document 1 proposes the following constitution. In order to enhance the durability of an air-ratio sensor by decreasing an atmospheric temperature in the periphery of the catalytic converter in the engine room, passage-like duct portions are arranged in both side portions of a heat shielding plate for covering a front face of the catalytic converter.

Patent Document 2 proposes the following constitution. In a transverse V-type engine, a lower end portion of the front side exhaust manifold and a lower end portion of the rear side exhaust manifold are joined to each others so as to compose a single exhaust pipe. In a portion of the exhaust pipe in the front of the engine, a catalytic converter is arranged so that components attached in the periphery of the catalytic converter can be prevented from being thermally deteriorated.
Patent Document 1: Japanese Patent Publication No. 2005-171792A
Patent Document 2: Japanese Patent Publication No. 8-144751A In the above described related-art V-type engine for a vehicle, the following problems may be encountered. When catalytic converters are symmetrically arranged in both side portions in the vehicle width direction of V-type engine, it is difficult for auxiliary machine components to be arranged in portions except for the upper portions of both the catalytic converters. Accordingly, the auxiliary machine components must be necessarily arranged above both the catalytic converters. In this case, the auxiliary machine components are thermally deteriorated by the heat transmitted from the catalytic converters. Therefore, the durability is lowered.

SUMMARY

It is therefore an object of the present invention is to provide an exhaust device of a V-type engine for a vehicle, capable of preventing a heat deterioration of the auxiliary machine components and a decline of the durability, which is caused by the heat deterioration, by suppressing a heat transfer from the catalytic converter to the auxiliary machine components.

In order to accomplish the above objects, according to an aspect of the present invention, there is provided an exhaust device of a V-type engine for a vehicle, the V-type engine disposed in an engine room of the vehicle so that each cylinder bank of the V-type engine extends substantially in a vehicle length direction, the exhaust device comprising: exhaust manifolds attached to both side of the V-type engine in a vehicle width direction, respectively; and catalytic converters attached to both gathering portions of the exhaust manifolds, respectively, in a manner that an axial line of each of the catalytic converters extends substantially in a vehicle height direction; wherein an auxiliary component is disposed above one of the catalytic converters in the engine room; wherein an oil pan is attached to a lower portion of the V-type engine, wherein the one of the catalytic converters is located lateral to the oil pan; and wherein a center line of lower portion of the oil pan is shifted with respect to a center line of the vehicle in the vehicle width direction so that the lower portion of the oil pan is away from the one of the catalytic converters.

With the above configuration, the one of catalytic converters which is disposed below the auxiliary component is located lateral to the oil pan which is attached to the lower portion of the V-type engine. Therefore, a space formed between the catalytic converter and the auxiliary component is extended and the heat transfer from the catalytic converter to the auxiliary component is suppressed. Accordingly, the heat deterioration of the auxiliary component and the decline of the durability caused by the heat deterioration of the auxiliary component can be prevented.

Since the one of the catalytic converters is located at a position where a large amount of air current flows when the vehicle is running, the one of the catalytic converters can be effectively cooled by the air current and a rise in the temperature of the one of the catalytic converters can be suppressed. Accordingly, it is possible to reduce a quantity of heat transfer from the one of the catalytic converters to the auxiliary component.

Since the lower portion of the oil pan is well separated from the one of the catalytic converters in the vehicle width direction, the amount of the air current which flows at the side of the lower portion of the oil pan can be increased. With the air current, the one of the catalytic converters can be more effectively cooled and a rise in the temperature can be enough suppressed.

A mount device which supports the V-type engine on the vehicle may be located in front of the one of the catalytic converters in the vehicle length direction; and an inlet portion of the one of the catalytic converters may be located in the rear of the mount device in the vehicle length direction so as not to be covered by the mount device as seen from the front of the vehicle.

In the catalytic converter, the temperature of the inlet portion tends to be high relative to that of the other portion. With the above configuration, the inlet portion of the one of the catalytic converter can be effectively cooled by the air current passing through the mount device. Therefore, a rise in the temperature of the one of the catalytic converters can be suppressed. Therefore, a heat transfer from the one of the catalytic converter to the auxiliary component which is located above the one of the catalytic converters can be suppressed. Accordingly, a heat deterioration of the auxiliary component and a decline of the durability caused by the heat deterioration of the auxiliary component can be more effectively prevented.

The one of the catalytic converters may be disposed obliquely so that the axial line thereof extends obliquely in the vehicle height direction, thereby forming a space below a block heater attached to a cylinder block of the V-type engine. The auxiliary component may include at least one of a brake booster and a block heater.

With the above configuration, since the one of the catalytic converters which is located below the auxiliary component is disposed obliquely, a large space can be formed below the block heater. Accordingly, a heat transfer from the one of the catalytic converters to the block heater can be suppressed and the block heater can be effectively cooled by the air current which flows through the space. Therefore, a rise in the temperature of the block heater can be prevented, which enhances the durability and the operation stability of the block heater.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Hereinafter, an embodiment of the present invention will be described with reference to the accompanying drawings.

Figure 1:
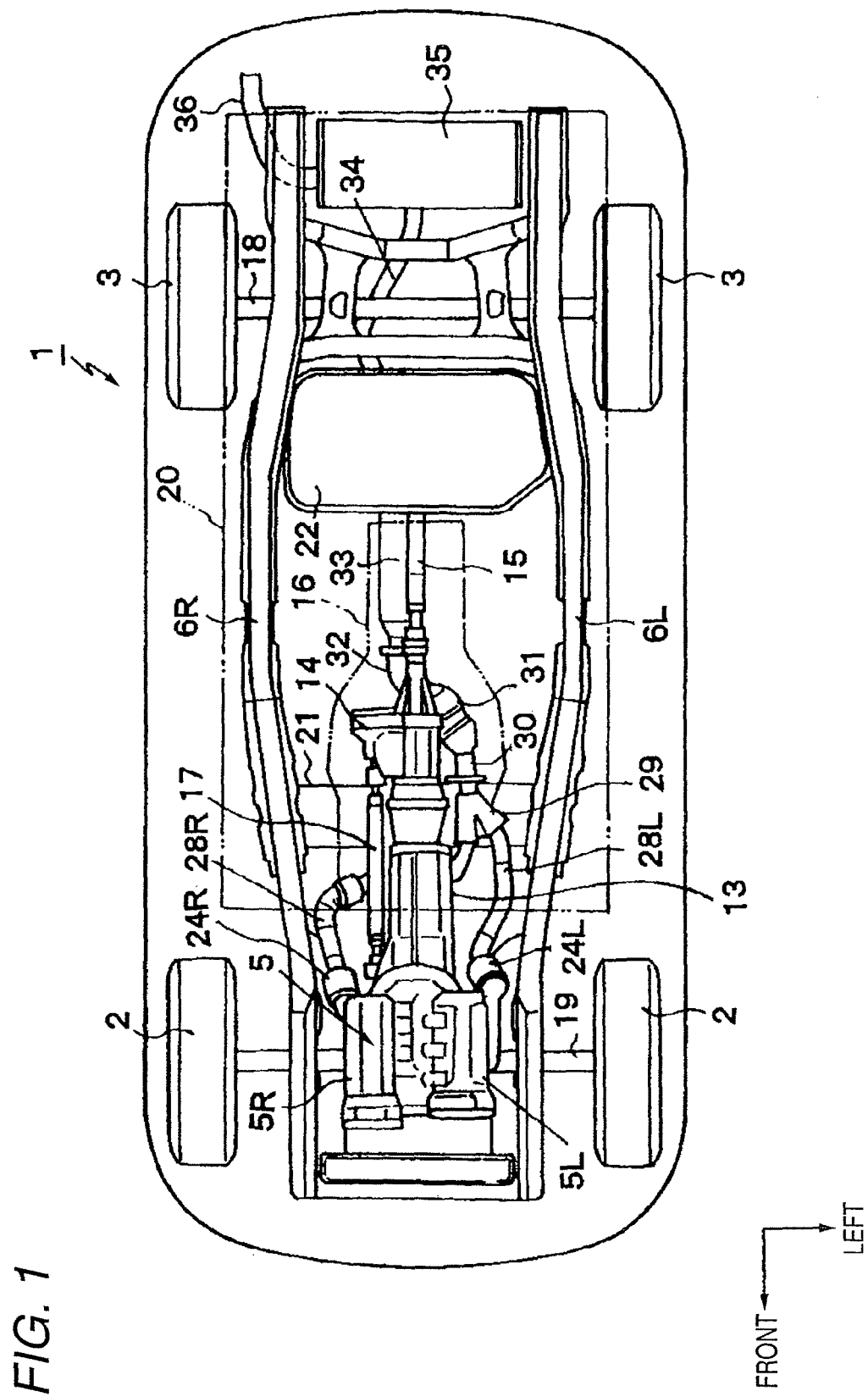
FIG. 1 is a plan view of a vehicle having an exhaust device according to an embodiment of the present invention.
Figure 2:
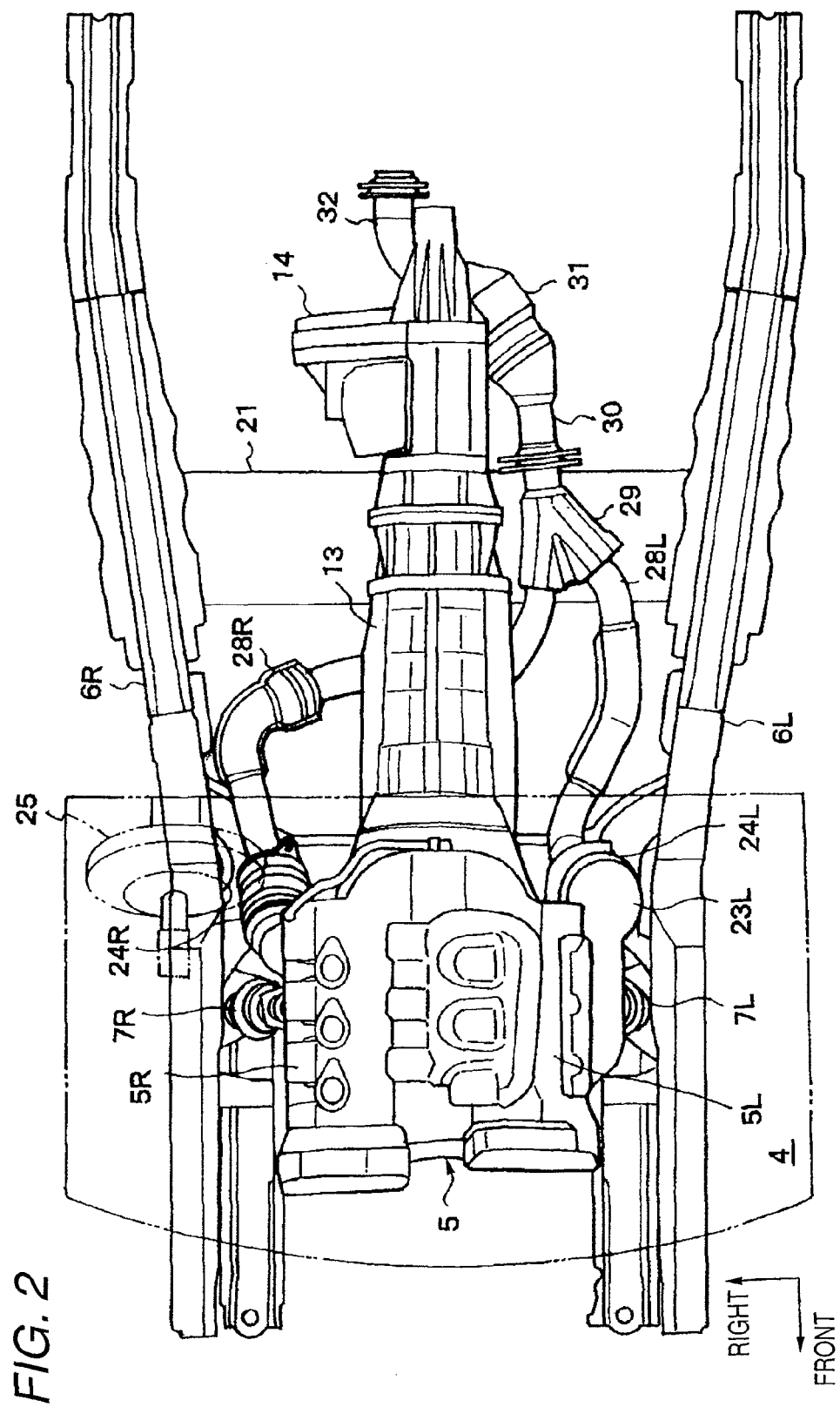
FIG. 2 is a plan view of a front portion of the vehicle having the exhaust device according to the embodiment.

The vehicle 1 shown in FIG. 1 is a four-wheel drive vehicle (4 WD vehicle). In this vehicle 1, the front wheels 2 and the rear wheels 3 can be simultaneously driven. In the engine room 4 shown in FIG. 2 arranged in the front portion of the vehicle 1, the V-type 6-cylinder engine 5, which is a drive source, is mounted. As the detail is shown in FIG. 2, this V-type engine 5 is longitudinally arranged in the engine room 4 so that right and left cylinder banks 5R, 5L of the V-type engine 5 extend substantially in a vehicle length direction. The right and left cylinder banks 5R, 5L are formed into a V-shape in the front view and which are inclined to the right and the left with respect to the center line M of the vehicle.

Figure 3:
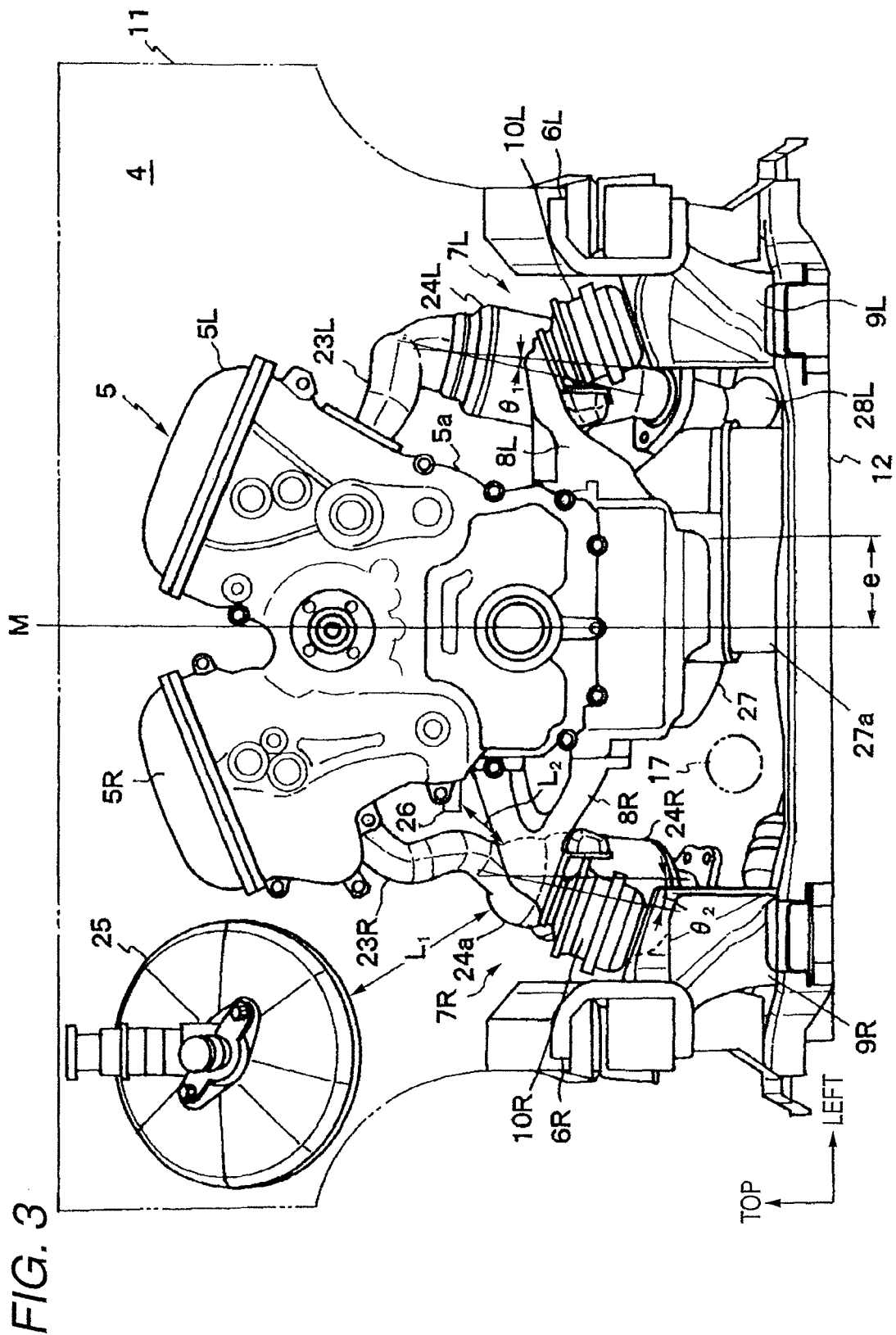
FIG. 3 is a front view of an engine room of the vehicle having the exhaust device according to the embodiment.

As shown in FIG. 3, both side portions on the right and the left of the V-type engine 5 are supported in such a manner that the right and the left mount device 7R, 7L are supported by a pair of the right and the left side frame 6R, 6L extending in the vehicle length direction (the direction perpendicular to the surface of FIG. 3). In this case, the right and the left mount device 7R, 7L are composed in such a manner that the mounts 10R, 10L, which have elastic bodies, are provided between the mount brackets 8R, 8L arranged in a lower portion of the cylinder block 5a of the V-type engine 5 and the mount brackets 9R, 9L attached to the side frames 6R, 6L. In this connection, in FIG. 3, reference numeral 11 is a dash panel and reference numeral 12 is a sub-frame.

As shown in FIGS. 1 and 2, at the rear of the V-type engine 5, the transmission 13 is attached. At the rear of the transmission 13, the transfer 14 is attached. From the transfer 14, the rear propelling shaft 15 extends backward through the recessed tunnel 16 provided at the central portion in the vehicle width direction. Further, the front propelling shaft 17 extends forward on the right of the center of the vehicle width direction. As shown in FIG. 1, the rear propelling shaft 15 and the front propelling shaft 17 are respectively connected to the rear axle 18 and the front axle 19 through differential gears not shown in the drawing. In this connection, in FIG. 1, reference numeral 20 is a vehicle body floor, reference numeral 21 is a cross member provided between the right side frame 6R and the left side frame 6L, and reference numeral 22 is a fuel tank arranged in a rear portion of the vehicle.

In this connection, as shown in FIG. 3, in both side portions in the vehicle width direction of the V-type engine 5, specifically, in outside portions of the right and the left banks 5R, 5L, the exhaust manifolds 23R, 23L, which are connected to exhaust ports not shown open to the banks 5R, 5L, are respectively attached. In gathering portions of the exhaust manifolds 23R, 23L, the catalytic converters 24R, 24L, each of which has substantially cylindrical shape are attached under the condition that axes of the catalytic converters 24R, 24L are extending in the lower direction of the vehicle body. In this structure, the right catalytic converter 24R is arranged below the brake booster 25 and the block heater 26 which are auxiliary machine components arranged in the engine room 4.

As shown in FIG. 3, the right and the left catalytic converter 24R, 24L are asymmetrically arranged in the engine room 4. In the front view, the left catalytic converter 24L is arranged being inclined by angle $\theta 1$ shown in the drawing so that the axis of the left catalytic converter 24L is extended obliquely downward toward the inside of the vehicle body. The right catalytic converter 24R is arranged being inclined by angle $\theta 2$ shown in the drawing so that the axis of the right catalytic converter 24R is extended obliquely downward toward the outside of the vehicle body. Therefore, a space is formed below the block heater 26 described before attached to the cylinder block 5a of the V-type engine 5.

Figure 4:
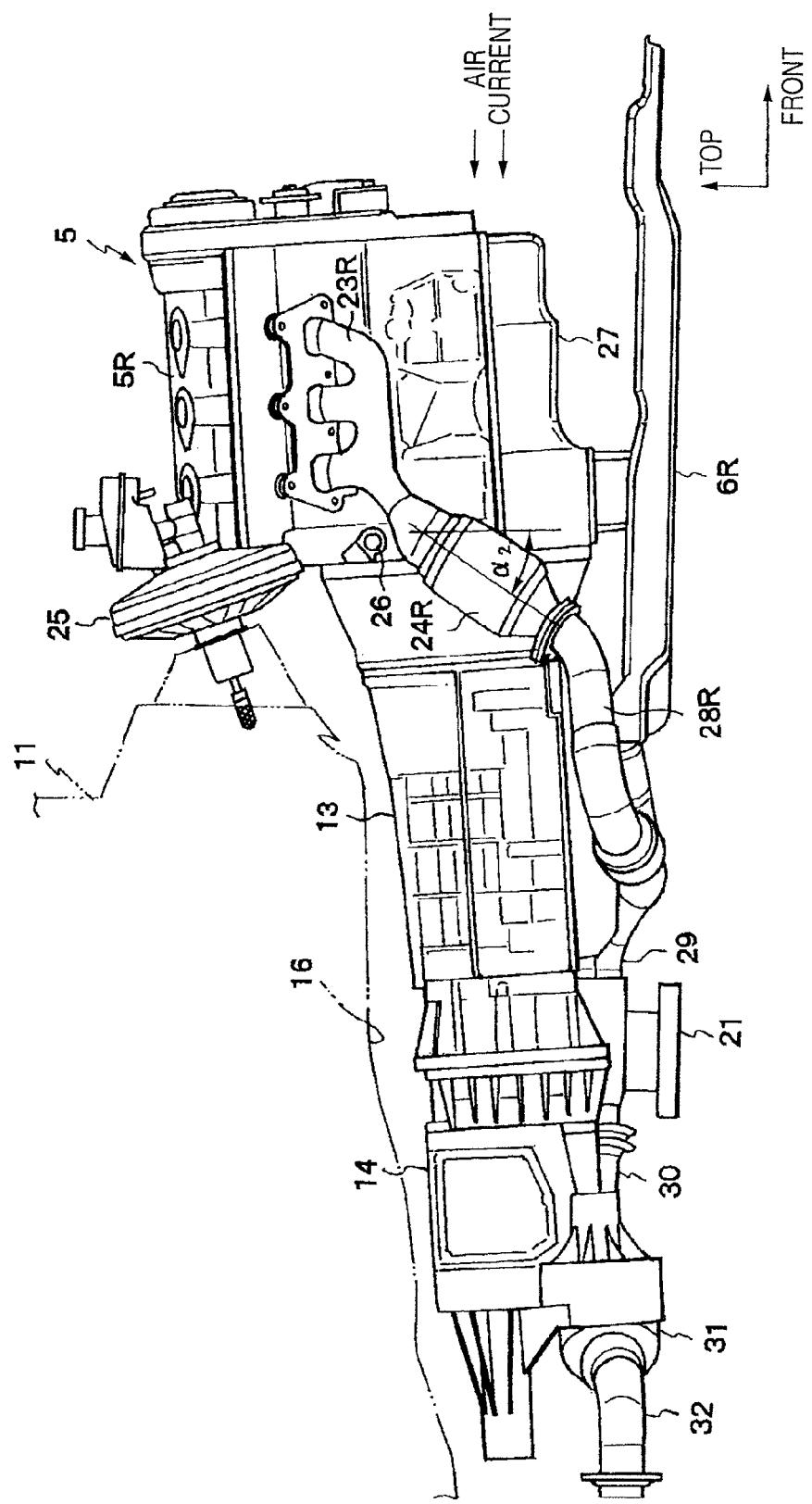
FIG. 4 is a right side view of the engine room of the vehicle having the exhaust device according to the embodiment.
Figure 5:
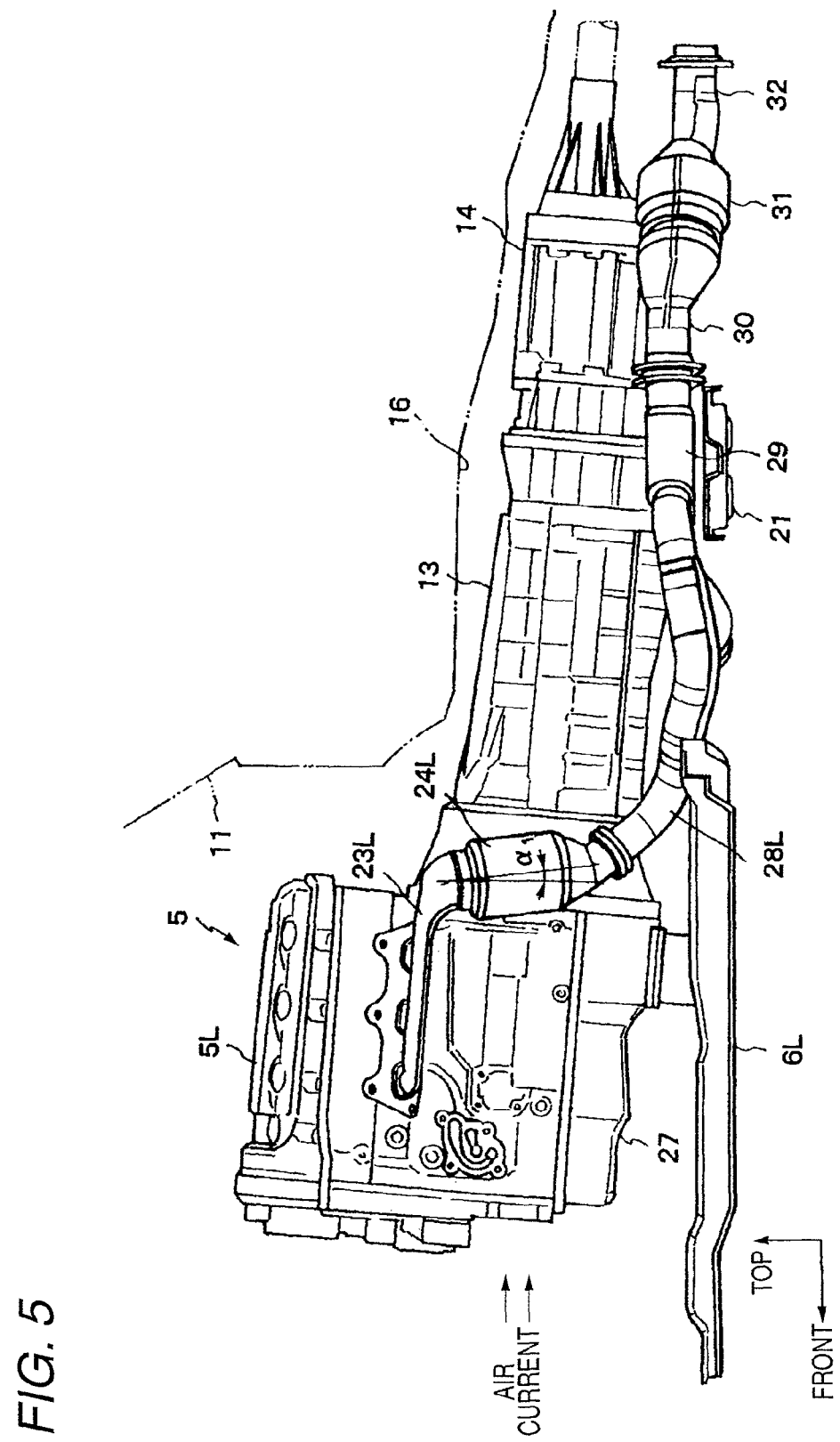
FIG. 5 is a left side view of the engine room of the vehicle having the exhaust device according to the embodiment.

In the side view, as shown in FIG. 5, the axis of the left catalytic converter 24L is arranged being inclined obliquely downward by the angle $\alpha 1$ in the drawing toward the rear of the vehicle body. On the other hand, as shown in FIG. 4, the axis of the right catalytic converter 24R is arranged being inclined obliquely downward by the angle $\alpha 2$ in the drawing toward the rear of the vehicle body. In this case, the inclination angle $\alpha 2$ of the right catalytic converter 24R is larger than the inclination angle $\alpha 1$ of the left catalytic converter 24L ($\alpha 2 > \alpha 1$).

Further, as shown in FIG. 2, the mount devices 7R, 7L are located in front of the right and the left catalytic converters 24R, 24L in the vehicle length direction. As shown in FIG. 3, an inlet portion 24a of the right catalytic converter 24R is located in the rear of the right mount device 7R so as not to be covered by the right mount device as seen from the front of the vehicle. In other words, the inlet portion 24a of the right catalytic converter 24R is exposed in the front view. Accordingly, the distance L1 can be maintained between the inlet portion 24a of the right catalytic converter 24R and the brake booster 25. Further, the distance L2 can be maintained between the inlet portion 24a of the right catalytic converter 24R and the block heater 26.

As shown in FIG. 3, the right catalytic converter 24R is located lateral to the oil pan 27 which is attached to the lower portion of the V-type engine 5. The lower portion 27a of the oil pan 27 is deformed so that the center line of the lower portion 27a is separated from the center line M of the vehicle by the distance e in the drawing. Therefore, the lower portion 27a of the oil pan 27 can be away from the right catalytic converter 24R.

As shown in FIGS. 1 and 2, from the left catalytic converter 24L, the exhaust pipe 28L is extended to the rear of the vehicle body. The exhaust pipe 28R is extended from the right catalytic converter 24R to the rear of the vehicle body and then bent at a substantially right angle toward the left exhaust pipe 28L. Therefore, both exhaust pipes 28R, 28L are gathered at the gathering portion 29. The exhaust pipe 30 extending from the gathering portion 29 to the rear of the vehicle body is connected to the catalytic converter 31. As shown in FIG. 1, the exhaust pipe 32 extending from the catalytic converter 31 to the rear of the vehicle body is connected to the sub-cooler 33. The exhaust pipe 34 extending from the sub-cooler 33 in the vehicle direction is connected to the main muffler 35 laterally arranged in the rear end portion of the vehicle body. From the right end portion of the main muffler 35, the exhaust pipe 36 is extended outside and then bent to the rear side of the vehicle and an end portion of the exhaust pipe 36 is open to the atmosphere.

In the exhaust device as described above, when exhaust gas, which is generated when the V-type engine 5 is driven, flows into the right and the left catalytic converters 24R, 24L through the right and the left exhaust manifolds 23R, 23L, the exhaust gas is purified. Then the exhaust gas passes in the right and the left exhaust pipes 28R, 28L and flows into the gathering portion 29. After the exhaust gas has gathered in the gathering portion 29, it flows from the exhaust pipe 30 to the catalytic converter 31 and is purified again. Then, the exhaust gas flows from the exhaust pipe 32 to the sub-muffler 33 so as to deaden a noise. After that, the exhaust gas flows into the main muffler 35 through the exhaust pipe 34. In the main muffler 35, a noise of the exhaust gas is deadened again and then the exhaust gas is discharged into the atmosphere from the exhaust pipe 36.

When the vehicle is running, air current flows from the front of the vehicle into the inside of the vehicle through an opening formed on a bumper which is provided in the front of the vehicle. The air current inside the vehicle flows through the recessed tunnel 16 and downside of the floor 20, and then flows outside of the vehicle.

In the exhaust device of the present embodiment, since the right converter 24R, which is located below the auxiliary machine component such as the brake booster 25 and the block heater 26, is located lateral to the oil pan 27 which is attached to a lower portion of the V-type engine 5, a space formed among the catalytic converter 24R, the brake booster 25 and the block heater 26 is expanded and a heat transfer from the catalytic converter 24R to the brake booster 25 and the block heater 26 can be suppressed. Therefore, it is possible to prevent a heat deterioration of the brake booster 25 and the block heater 26. Further, it is possible to prevent a deterioration of the durability caused by the heat deterioration.

Especially, since the right catalytic converter 24R is located at a position where a large amount of the air current flows when the vehicle is running, the entire catalytic converter 24R can be effectively cooled by the air current. Accordingly, a rise in the temperature of the catalytic converter 24R can be suppressed and a heat transfer to the brake booster 25 and the block heater 26 can be reduced.

Since the lower portion 27a of the oil pan 27 is well separated from the right catalytic converter 24R in the vehicle width direction, it is possible to increase the amount of the air current flowing at the side of the oil pan 27. By this air current, the catalytic converter 24R can be more effectively cooled and the temperature rise can be suppressed.

Further, in the present embodiment, the inlet portion 24a of the right catalytic converter 24R is located in the rear of the right mount device 7R so as not to be covered by the right mount device 7R as seen from the front of the vehicle (see FIG. 3). Although the temperature of the inlet portion 24a tends to be high relative to that of the other portion of the right catalytic converter 24R, the inlet portion 24a can be effectively cooled by the air current flowing through the mount device 7R. Accordingly, it is possible to prevent a rise in the temperature of the catalytic converter 24R. Therefore, a heat transfer to the brake booster 25 and the block heater 26, which are arranged above the catalytic converter 24R, can be suppressed. Accordingly, a heat deterioration of the components can be more effectively prevented. Further, it is possible to prevent the durability from being deteriorated.

In the present embodiment, the right catalytic converter 24R is arranged in a manner that an axis of the right catalytic converter 24R is extended obliquely downward toward the outside of the vehicle. Therefore, as shown in FIG. 3, a relatively large space can be formed below the block heater 26. Accordingly, it is possible to suppress a heat transfer from the catalytic converter 24R to the block heater 26. Further, by the air current flowing in the space, the block heater 26 can be effectively cooled and a rise in the temperature of the block heater 26 can be prevented. Therefore, the durability and the operation stability of the block heater 26 can be enhanced.

In the case explained above, the present invention is applied to the embodiment of the exhaust device of the V-type 6-cylinder engine that is longitudinally disposed in a four-wheel drive vehicle. Of course, the present invention can be applied to an exhaust device of a V-type engine having a plurality of cylinders.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An exhaust device of a V-type engine for a vehicle, the V-type engine disposed in an engine room of the vehicle so that each cylinder bank of the V-type engine extends substantially in a vehicle length direction, the exhaust device comprising:
   exhaust manifolds attached to both side of the V-type engine in a vehicle width direction, respectively;
   catalytic converters attached to both gathering portions of the exhaust manifolds, respectively, in a manner that an axial line of each of the catalytic converters extends substantially in a vehicle height direction; and
   a brake booster disposed above one of the catalytic converters in the engine room;
   wherein an oil pan is attached to a lower portion of the V-type engine;
   wherein the one of the catalytic converters is located lower than the other of the catalytic converters;
   wherein the one of the catalytic converters is located lateral to the oil pan; and
   wherein a center line of lower portion of the oil pan is shifted with respect to a center line of the vehicle in the vehicle width direction so that the lower portion of the oil pan is away from the one of the catalytic converters.

2. The exhaust device as set forth in claim 1,
   wherein a mount device which supports the V-type engine on the vehicle is located in front of the one of the catalytic converters in the vehicle length direction;
   wherein an inlet portion of the one of the catalytic converters is located in the rear of the mount device in the vehicle length direction so as not to be covered by the mount device as seen from the front of the vehicle;
   wherein the one of the catalytic converters is arranged such that the axial line thereof is downwardly inclined toward the rear of the vehicle at a first inclination angle;
   wherein the other of the catalytic converters is arranged such that the axial line thereof is downwardly inclined toward the rear of the vehicle at a second inclination angle; and
   wherein the first inclination angle is larger than the second inclination angle.

* * * * *